July 3, 1951  T. A. BANNING, JR  2,559,105
AUTOMOBILE SPRING, AND THE LIKE
Filed Sept. 22, 1945  5 Sheets-Sheet 1

Inventor:
Thos. A. Banning jr

July 3, 1951

T. A. BANNING, JR

2,559,105

AUTOMOBILE SPRING, AND THE LIKE

Filed Sept. 22, 1945

Inventor:
Thos. A. Banning Jr

July 3, 1951  T. A. BANNING, JR  2,559,105
AUTOMOBILE SPRING, AND THE LIKE
Filed Sept. 22, 1945  5 Sheets-Sheet 5

$$A = \frac{K_1 \times a}{\sqrt{\omega^2 R^2 + (\omega^2 M - (K_1 + K_2))^2}}$$

Key:
- A, Amplitude of axle vibration.
- $K_1$, Spring constant of tires.
- a, Amplitude of road irregularities.
- $\omega$, Frequency of road irregularities.
- R, Resistance constant of springs.
- M, Mass of axle.
- $K_2$, Spring constant of springs.

Inventor:
Thos. A. Banning Jr.

Patented July 3, 1951

2,559,105

UNITED STATES PATENT OFFICE 2,559,105

AUTOMOBILE SPRING AND THE LIKE

Thomas A. Banning, Jr., Chicago, Ill.

Application September 22, 1945, Serial No. 617,967

9 Claims. (Cl. 267—47)

This invention has to do with improvements in automobile springs, and the like. The invention concerns itself primarily with improvements in leaf springs, or laminated springs, especially as such springs are designed and intended for use under the conditions existing in automobile running. The following comments will aid in understanding the improvements herein disclosed;

Since the leaf spring is interposed between the body and the axle of the automobile, and since the tires journalled to the axle are resilient, and are possessed of spring qualities, the vibrations of the axle will be affected by the following factors; the frequency and amplitude of irregularities which are encountered by the tires travelling over the road surface; the mass of the axle; the spring constant of the tires journalled to the axle; the spring constant of the leaf springs themselves; and any damping or resistance constant imposed between the axle and the body—that is to say, supplemental to the leaf springs themselves. These factors will affect the amplitude of axle vibrations, and this relationship may be expressed very closely by the following equation:

$$A = \frac{K_1 a}{\sqrt{W^2 R^2 + (W^2 M - (K_1 + K_2))^2}}$$

where "$a$" equals the amplitude of road vibrations; "$A$" equals the amplitude of axle vibrations; $K_1$ equals the spring constant of the tires; $K_2$ equals the spring constant of the leaf springs connected to the axles and to the body; $W$ equals the frequency of encountering road irregularities (depending on the rate of travel); $M$ equals the mass of the axles; and $R$ equals a resistance constant to be presently discussed herein, which resistance constant is interposed between the axles and the body supplemental to the leaf springs themselves.

It is here noted that the amplitude of axle vibrations materially affects the transmission of vibrations to the body of the running automobile, and it is greatly to be desired that the axle vibrations be held to a small amplitude. The relationship expressed by the foregoing equation may be shown graphically by the diagram of Figure 19. In that figure the tires are shown as being interposed between the road surface and the axles, and as having a spring constant "$K_1$," the mass of the axles being shown by "$M$"; and the "compound springs" are shown as being interposed between the axles and the automobile body, and as having a spring constant "$K_2$" and a resistance constant "$R$." The amplitude of road irregularities is shown by "$a$" and the amplitude of axle vibrations is shown by "$A$."

The resistance imposed to the sliding movement of the leaves of a leaf spring due to the movement of the leaves on each other is in a sense a factor "$R$" of the foregoing equation; but it is here noted that this "$R$" is not a desired nor an intended factor in the equation, nor is its value accurately predeterminable, nor a constant factor of the equation, since it will vary from day to day and from hour to hour, according to conditions of lubrication, and according to weather conditions, and other undeterminable conditions. This form of "$R$" is greatly to be avoided in leaf spring design.

According to a prime feature of my present invention I provide between the leaves of the spring a body or bodies of resistance material which is attached to the leaves between which it is placed, and which body or bodies serve to affect the action of said leaves controllably or in more or less predetermined manner at all times and under all conditions of weather, and without need of any lubrication between the adjoining leaves. Such body or bodies of resistance material affects the vibrational condition of the spring generally according to the conditions of the foregoing equation.

Examination of said equation shows at once that the amplitude of axle vibrations (which vibrations are in a vertical direction) depends in inverse manner of the magnitude of the square of the value of "$R$," since the factor $W^2 R^2$ is one of the quantities contained within the square root sign of said equation. It is also seen from examination of that equation that as this factor "$R$" is increased, the magnitude of the divisor of said equation is increased, with corresponding decrease of the value of the amplitude "$A$." It is further seen that by reducing the value of $K_2$ (which is the spring constant of the leaf springs) a reduction in the value of the negative element of said divisor is produced (since $K_2$ is included in the negative portion of the squared element $(K_1+K_2)$). Such reduction of $K_2$ may be properly secured by making the spring "soft" by using thinner leaves and more of them in the complete spring, in order to secure required sustaining power for the load to be carried.

I propose to provide between the leaves of the spring interlayers of "resistance" material, said layers being cemented or otherwise suitably adhered to the adjoining surfaces of the proximate leaves. Generally this "resistance" material will have little if any spring constant in itself, but in some cases also I propose to use for such interlayers material which does also have springy quality, for other reasons which will presently become apparent. For example, in some cases a suitable quality of high resistance "rubber" may be used for these interlayers. However, the resistance constant of such interlayers shall be a controlling factor in their selection.

As a suitable material for such interlayers I may mention what is known as "soft Pyralin," a cellulose nitrate product of E. I. du Pont de Nemours & Company. This and similar materials are of a highly damping nature, and such materials have a high internal resistance against distortion; but under sustained force such a material will suffer a permanent distortion, assuming a new contour or form to which it has been distorted; but by a like token, by application of a sustained force in contrary direction, the form and contour of the body of such material may be restored to its original form, which it will then retain until subjected to another sustained distorting force. Such material is therefore not capable in itself of sustaining the loads to which the spring leaves are subjected in service, and accordingly, when such a material is used as the interlayer material provision must also be made for carrying the transmitted loads from leaf to leaf of the assembled spring. Nevertheless such material may be admirably used as the resistance or damping element in combination with the spring constant function of the spring leaves themselves.

I propose to so form and assemble the multi-leaf spring of my present invention, that between successive leaves thereof there are placed interlayers of the high resistance material, with said interlayers suitably cemented or adhered to the faces of the leaves; and I also provide between successive spring leaves at the central or supporting portion of the spring, interspacers which are of the same or substantially the same thickness as these interlayers of high resistance material, so that the forces between the leaves are transferred directly by these spacers; and I also propose to provide at the ends of the leaves suitable spacers which will act to transfer the necessary forces between the leaves at such points, so that the interlayers of resistance material will not be subjected at any point to forces of compression (or tension), but will perform their resistance functions primarily or solely by distortion of said interlayers due to the endwise shift occurring between the successive leaves, which shift has already been referred to in this specification. The adherence of the interlayers to the proximate surfaces of the leaves will ensure that such endwise shifts of the leaves relatively to each other shall produce such distortions in the interlayer bodies of resistance material, so that said interlayers shall be able to perform their functions in the manner intended.

When a leaf spring is assembled its leaves are in relaxed form, and with maximum curvature. When such spring is installed in the automobile it is subjected to normal loading, and deflects or straightens out to a degree imposed by such normal loading. This loading will cause the leaves to slide on each other to an extent which places them in what may be called their "normal loading" positions. When such automobile is thereafter placed in service, and is further loaded, and when it is running over the irregular surfaced road, the springs will be subjected to deflections carrying the leaves to further deflected condition (under added loading), or to less deflected condition (due to recoils, etc.), but the flexings of the spring, first in one direction and then in the other direction, will occur more or less back and forth with respect to such "normal loading" condition. In such flexings the leaves will be caused to slide back and forth with respect to each other; and in the case of the presence of such interlayers as herein contemplated said interlayer bodies will be subjected to distortions of form, to greater or less degrees according to the extent of such leaf deflections and the other factors of the installation and design of the springs.

If the interlayer resistance bodies be formed of high resistance material such as the soft Pyralin heretofore mentioned, and with the interlayer bodies cemented to the faces of the spring leaves, such interlayer bodies will possess the quality or ability to accommodate themselves after an interval of time to the changes of form imposed by relative sliding movements of the leaves with respect to each other; and when such accommodations of form have occurred, these interlayer resistance bodies will then provide their "resistance" effects against subsequent changes of form, provided such subsequent changes be relatively rapid, such as occur in the normal driving of the automobile. On the other hand, slow changes, or changes which are effected and then retained for substantial intervals of time, will produce further accommodations in the forms of the interlayers, due to the nature of the material from which said interlayers are made.

The frequencies of vibrations to be taken care of by the automobile springs are of varied values and natures. Generally it may be expected that body frequencies may be of the order of one per second, whereas road irregularities may be encountered at much higher rates, and depending generally on the rate of automobile travel. However, such road imposed vibrations may be of the order of ten or more per second, largely depending on rate of travel. They will generally be of the order of five or six or more per second. Such rates of even one per second are greatly in excess of the possible rate of accommodation of the "resistance" material, such as soft Pyralin, so that vibrations of the order of rates to be expected in automobile operation will not permit of accommodation of the contours of the interlayers, but will result in production of the desired damping or resistance effects in normal operations.

It will, however, be seen from the foregoing analysis that even if the interlayers be built into the spring when the leaves of such spring are in relaxed condition, and most fully curved, still, upon installation of such a spring into the automobile, and subsequent lowering of the automobile body into load and running condition on the axles, the interlayers of such resistance material will, after a relatively short time, accommodate themselves to their normally flexed condition, and thereafter, during the ordinary running of such automobile over roads, these resistance material interlayers will produce their intended resistance effects in harmony with the spring constant effects of the spring leaves.

It is also noted that, since the accommodation in form of these interlayer bodies occurs when the leaves are in their condition of flexure produced by the normal loading of the springs, whenever said springs are subjected to a lessened loading, as will of course occur each time a bump or irregularity is encountered, these interlayers will act in direction to resist such lessening of flexure as accompanies such lessened spring loading, and will also act at other times to resist increased flexure due to increased loading of the springs. In other words, said interlayers will act in both directions, always resisting a tendency of the spring leaves to change to another condition of flexure. Thus said interlayers will produce at all times a damping or snubbing effect directly in the body of the assembled spring itself, and without the need of providing other and supplementary snubbers or shock-absorbers. Still said interlayers will not detract from the spring qualities of the springs themselves, since said spring qualities will depend on the spring constant $K_2$ of the aforementioned equation; and if desired use may be made of leaf springs having more leaves and of thinner material, than has heretofore been customary for certain prescribed specifications.

Increase of the value of "R" in said equation results in lessening of the amplitudes of vibrations produced by specified imposed forces of specified frequencies. Examination of the curves of Figure 20 will show this effect very strikingly. In that figure I have shown the variation of amplitude of vibrations of the axle in comparison to frequency for five different values of "R," one of said values of "R" being zero, in which case the amplitude of vibrations at resonant frequency is theoretically infinite. However, for the several values of $R_1$, $R_2$, $R_3$, and $R_4$, shown in these curves it is evident that the amplitudes, even at resonant frequency, become successively smaller, until finally with the value of $R_3$, there is substantially no increase of amplitude at resonant frequency, and at the value of $R_4$, the curve assumes a form which has no rise of value whatsoever, even at resonant frequency. It is thus evident that by selecting a high enough value of "R," and providing an interlayer body of proper material, and of proper size and form in comparison to the spring leaves themselves, the conditions of curves of $R_3$ and $R_4$ may be approximated or realized in the spring design. This will mean that such a spring will be able to flex properly under varying load conditions, but will not have any increase (substantial) of amplitude of vibrations, at any rate of vibrations, including resonant frequency. It is also noted that as the values of "R" are increased according to Figure 20, the resonant frequencies become less, as shown by the curve drawn through the peak points of the curves of $R_0$, $R_1$, $R_2$, $R_3$, and $R_4$. Thus the resonant frequency of a leaf spring having interlayers of the high resistance material according to the present invention will be less than the resonant frequency for such spring (having the same leaves) without such high resistance material interlayers. Since the frequencies encountered by reason of road irregularities are however rather high, the lowering of the resonant frequency by the interposition of the high resistance material interlayers will not generally affect the action of the spring against such axle vibrations due to road irregularities. The body frequencies are much lower than the axle frequencies, so there is no danger of bringing the axle frequency down to the body resilient frequency by reason of such interlayer effects on the forms of the curves of Figure 20.

Further considering the equation hereinbefore stated, it is evident that the constants $K_1$, $K_2$ and R are considered in that equation as representing the respective spring and resistance constants of the elements as a whole. Thus, for example, the constant $K_2$ and the constant R represent respectively the spring and resistance constants of the leaf springs as a whole. If we consider the resistance constant R this is the damping or resistance effect produced in the entire spring, and including all the interlayers between the various leaves. Since these leaves are graduated in length from top to bottom of the spring it follows that the resistance effects of the various interlayers differ largely from top to bottom of the complete spring. Furthermore, this resistance effect is due to the forced deformation of the body of resistance material due to change in curvature of the leaves under varying load. Further considering any single interlayer it is evident that the shift of a leaf with respect to the adjacent leaf varies for any given change of load with the distance from the point of spring support. This point of support is generally near the middle of the spring, at the point of axle connection, the loads being imposed on the ends of the spring by the shackle connections. Such variation of shift extends from zero at the point of support on the axle to a maximum at the end of the shorter leaf; and this variation is more or less proportionate to the distance from the point of axle support.

Now the resistance effect depends on the amount of deformation suffered by the body of resistance material in a given time interval, so since this body of resistance material is cemented to the leaf surfaces throughout the length of the shorter leaf it follows that the deformation, in the case of an interlayer of uniform thickness, will vary more or less proportionately (during a given time interval) with increase as the point of axle support is departed from. It thus follows, that for the case of an interlayer of uniform thickness those portions of the interlayer farthest removed from the point of axle support or connection, will suffer greatest deformation, and will produce the maximum amount of resistance or damping effect (for a deformation in a given time interval). In other words, if we consider the interlayer body as being composed of a great number of short but contiguous sections, each cemented to the faces of the proximate spring leaves, those sections farthest removed from the point of axle connection will suffer maximum deformation when the curvature of the spring is changed, and as we progress towards the point of axle connection these imaginary sections will suffer less and less deformation, until finally at the point of axle connection there will be no deformation whatsoever.

The foregoing effect may also be considered as being due to the fact that each such imaginary or differential section of the interlayer is deformed by an amout due to the slight angular change which it suffers with respect to the leaf surfaces to which it is cemented. If the distance between the leaves is constant (the thickness of the interlayer being constant), it follows that for the imaginary sections farthest from the point of axle connection this angle will suffer a maximum change; and the angular changes suffered by succeding sections as we approach closer and closer to the point of axle connection will become less and less, until at the point of axle connection such angular change is zero.

The foregoing analysis shows that for the case of interlayers of uniform thickness from end to end the material of such interlayers is not uniformly effective for damping action, or in other words, the damping interlayers are not being used to their maximum benefit. I shall now show that other arrangements may be used which will make possible a more effective or efficient use of these interlayers for damping action.

First, it was pointed out that the leaves are of progressively shorter length generally from top to bottom of the assembled spring. It will be seen that under this condition those lower and shorter leaves will suffer less total slip or shift with respect to the proximate leaves than is the case for the longer leaves. Therefore if all the interleaves be of the same thickness it is evident that these interlayers between the lower and shorter leaves will suffer less distortion than the higher and longer interlayers, and thus will be less efficient, in proportion to their mass than the higher interlayers (for deformation in a given time interval). I contemplate as a further improvement the progressive lessening of the thicknesses of the interlayers substantially in proportion to the lengths thereof. It has been previously pointed out that since the interlayer is cemented or otherwise secured to the proximate faces of the leaves it follows that the deformation suffered by such interlayer at any given point measured from the axle connection will depend on the thickness of the interlayer at such point and the relative shift between the leaves at such point. For a given amount of such relative shift it follows that the deformation, and therefore the resistance or damping action (for deformation in a given time interval) may be increased by lessening the thickness of the interlayer so that even for these shorter leaves the material of the interlayers will suffer substantially as much deformation as the longer interlayers between the longer leaves.

However, even with a progressive lessening of the thicknesses of the interlayers proportionately with the shortening of the leaves, each interlayer being of uniform thickness throughout its length, it is still true that each such interlayer will suffer a progressively greater amount of distortion as the distance from the point of axle support or connection is departed from, for the reasons already discussed. In order to produce substantially uniform distortion throughout the lengths of these progressively thinner interlayers I further contemplate as a more specific embodiment of my invention the progressive increase in thickness of each of these progressively thinner interlayers as the distance from the point of axle connection is departed from. By this means I provide interlayers which are so proportioned that each cubical or mass portion of said interlayers suffers substantially the same degree of distortion for a given change of spring loading, as is suffered by all other cubical or mass portions of said interlayers; in other words, I have provided an arrangement wherein all portions of all interlayers are "worked" to the same degree at all times.

I have already mentioned that I provide means to transmit the necessary forces directly between the spring leaves at their central or axle connection points, and also suitable spacers or supports between these leaves adjacent to their ends to transmit the forces of loading directly from leaf to leaf; so that the interlayers will not be subjected to such loading forces, but will only be subjected to the distortion or resistance forces for damping effects. I have herein disclosed various schemes for transmitting these forces, including a roller bearing scheme so that frictional contacts between moving portions of the leaves will be substantially eliminated.

It will be understood that the interlayers are cemented or otherwise adhered to the proximate leaf surfaces. Suitable cementing agents may be used for this purpose; but in the case of interlayers composed of "soft Pyralin" such as already mentioned a suitable cementing agent comprises some of such soft Pyralin dissolved in acetone or other suitable solvent. This cementing agent is readily used to apply the interlayers to the leaf surfaces, which surfaces should first be well cleaned; and after such application, and when the solvent has more or less completely evaporated the interlayer will be found to be adhered very firmly to the metal surfaces of the spring leaves. According to this process of application the interlayers may be provided in the form of sheets of the selected material (such as the soft Pyralin), said sheets being cut or formed to proper width, length, and thickness so that they may be set directly into place between the spring leaves as the latter are assembled into the complete spring. Thereafter the central portions of the entire assembly may be locked together by a through bolt or other means, and according to well understood practice.

In some cases it may be found that the interlayers may be provided between and cemented to the spring leaves in other ways than just above mentioned. For example, when using an interlayer material, such as soft Pyralin which has the property of softening under application of heat and without damage to the material itself, it may be found desirable to first assemble all the spring leaves, together with the required spacers between them; and thereafter the interlayer material may be either flowed or forced between the spring leaves under sufficient pressure to ensure good contact with the spring leaf surfaces, and to ensure complete fillage of the interlayer spaces. When such so formed complete spring is allowed to cool to normal temperatures it will be found that the interlayers have been securely attached to the spring leaf surfaces. In this connection the temperature needed for such process is much below the temperature at which damage would be done to the spring leaves themselves or to their spring qualities.

Sometimes, as in case of a great recoil in the running of the automobile, it may happen that the loads on the springs are momentarily completely relaxed, so that the spring leaves are permitted to assume their unloaded condition. Any further movement in the unloading direction due to such a severe recoil or other cause would tend to actually pull the spring leaves apart, separating them and either subjecting the interlayers of damping material to tension or actually tearing said interlayers from the spring leaf surfaces. In such an extreme case the value of the interlayers would be largely destroyed for any damping purpose, since the cementing attachment of the interlayers would be broken. Such an action might also be produced in the case of raising the automobile body by use of a jack or other device, as for example in changing a tire. I have therefore provided means to prevent any such excessive movement occurring as between the successive spring leaves so that such destructive effect will always be avoided.

Such prevention means may take the form of suitable clips or the like extending between the end portions of the successive leaves and tying them together against such direct separation, but said tying elements being of form which will not interfere with free endwise play between the successive leaves under changes of spring loading.

It is here noted that these interlayers serve also to close the spaces between the successive leaves, and that it is intended generally that the loading forces between the leaves shall be transmitted from leaf to leaf by suitable spacers. Generally these spacers will be located at the ends of the several leaves, and, if necessary, also between the central or axle point of connection, such condition existing when the interleaves are of appreciable thickness at or adjacent to such point of axle connection. In some cases it may be found desirable or sufficient to provide these interlayers only between portions of the spaces between the successive spring leaves, as for example, between the outer end portions, or possibly extending inwardly for one-half the distance to the point of axle connection. In other cases it may be found desirable to subdivide each complete interlayer into a series of distinct sections, either placed directly contiguous to each other or separated slightly from each other, or with individual spacers extending between the proximate spring leaves and located between such distinct interlayer sections. In any case, however, the interlayer sections are cemented or adhered strongly to the surfaces of the spring leaves so that each portion of interlayer is subjected to distortion during change of curvature or flexure of the spring leaves, and with the desired damping and other action. I have therefore illustrated such schemes hereinafter.

Generally, any suitable material may be used for these interlayers, but said material should be possessed of a deformable body, and capable of adherence to the surfaces of the spring leaves, and should generally have a relatively high internal resistance to deformation, consistent with the conditions of spring leaf action to be served. Various materials will be found satisfactory, and therefore I do not intend to limit myself, except as I may do so in the claims to follow. For example, certain qualities of high resistance rubber will be found satisfactory or very desirable for this purpose.

It is also noted that, since there are no relatively moving portions of the spring leaves in contact with each other, except the end portions, or those portions where spacers are provided, it is seen that there is substantially no need for lubrication or oiling of such "compound spring" as here disclosed. Even in the case of such interspacers I have herein disclosed means to provide rolling contacts between these parts, so they need not be lubricated. It is also noted that the interlayers serve to prevent accumulation of dirt and other foreign substances between the spring leaves.

It is also noted that the interlayers should be formed of material which will not seriously weather under the exposed conditions of use of these automobile springs; and the "soft Pyralin" possesses such qualities.

In the drawings:

Figure 2 shows a plan view corresponding to Figure 1; and Figure 1 may also be considered as a section taken on the line 1—1 of Figure 2, looking in the direction of the arrows;

Figure 6 shows a cross-section taken on the lines 6—6 of Figures 1, 2, 3 and 4, looking in the directions of the arrows;

Figure 11 shows a fragmentary plan view of another modified form of spring leaf arrangement, wherein provision is made for interlocking the successive leaves together so as to prevent drawing of one leaf from another under conditions of excessive recoil and the like;

Figure 19:
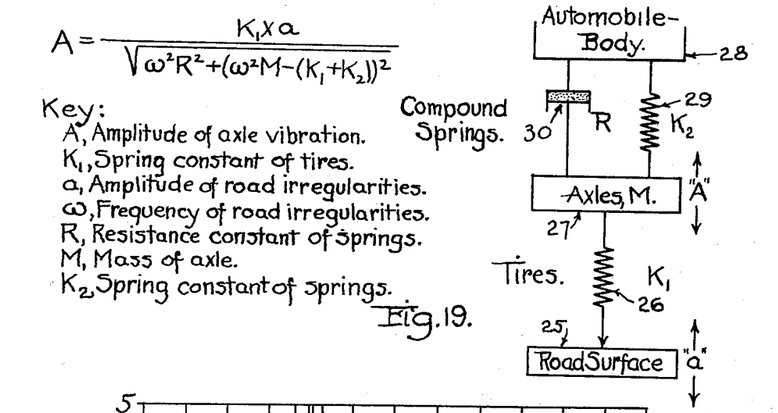
Figure 19 shows diagrammatically the relationship between the forces, spring constants, and resistance constant, and the mass, and the amplitudes of vibration, for a system including the automobile tires, the axles, the springs, the automobile body, and the "resistance" body, according to the conditions of the present invention.
Figure 20:
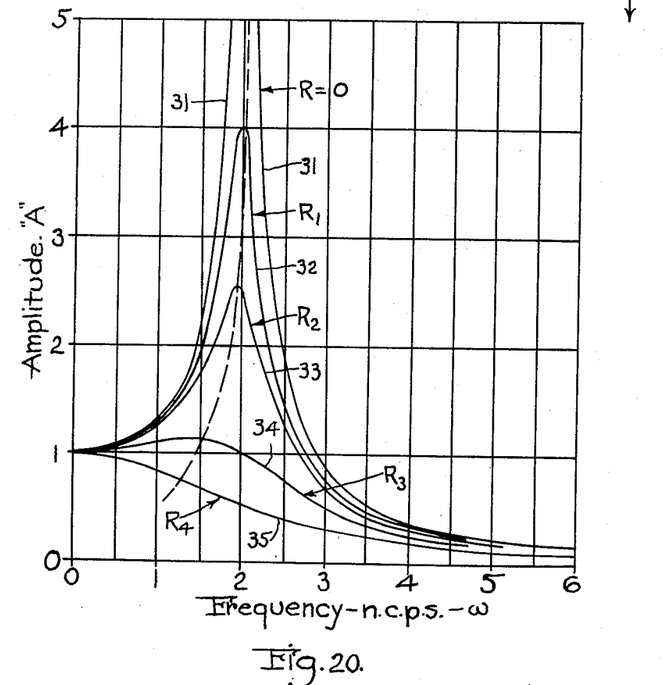
Figure 20 shows a family of curves showing the relationship between frequency of road irregularities and amplitude of vibrations of the axle, for a system of the form shown schematically in Figure 19.

Referring first to Figures 19 and 20, the road surface is shown at 25, the spring constant of the tires is shown by the element 26 ($K_1$), the axles of mass "M" are shown at 27, the automobile body is shown at 28, and the spring constant of the leaf springs is shown by the element 29 ($K_2$). The resistance constant of these leaf spring elements is shown by the element 30 (R), and since this constant acts between the axles and the body, it is shown alongside of the element or constant $K_2$. I shall presently show how I have embodied this resistance element directly into the leaf springs themselves, and of controllable and predeterminable amount. The equation shown at the left-hand side of Figure 19 shows the relation between these factors and constants, and which equation has been stated hereinbefore.

Figure 1:
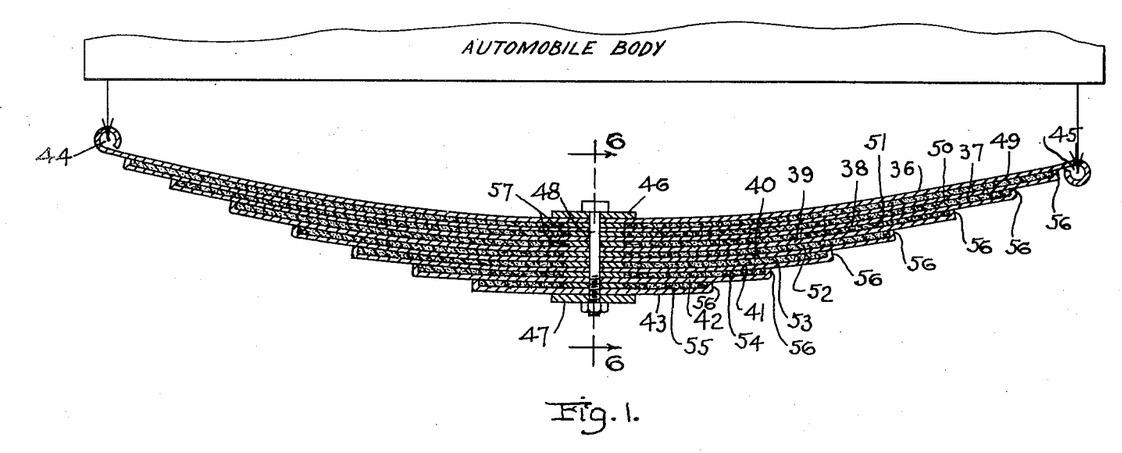
Figure 1 shows a longitudinal vertical section through a typical leaf spring embodying the features of the present invention, said spring being shown in relaxed condition, and provided with eight spring leaves and with the interlayers between said spring leaves.
Figure 2:
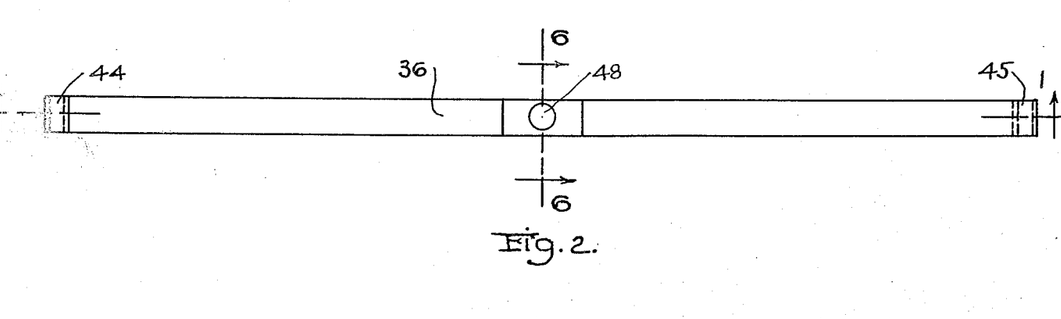

Solving this equation for various conditions of frequency, and for various values of "R," it is found that for each value of "R" there may be plotted a curve between frequency and amplitude of axle vibration "A." These are the curves 31, 32, 33, 34 and 35, for values of "R" equal to zero (curve 31), and for progressively larger values of "R" (curves 32, 33, 34 and 35). It will be seen that the peak values of these curves, for resonant conditions, become progressively lower as the value of "R" is raised, until at the condition of curves 34 and 35 there is substantially no peak to the curve, and in fact, for the condition of curve 35 the values of "A" become progressively lower as the frequency of the road irregularities becomes greater. This element "R" of the equation I provide by the interlayers of damping or resistance material which I interpose between the successive spring leaves, as I shall now explain:

In Figures 1 and 2 I have shown a typical assembled leaf spring embodying certain of the features of my present invention; and in this case there are shown the eight spring leaves 36, 37, 38, 39, 40, 41, 42 and 43 of progressively shorter lengths, measured from top to bottom of the assembled spring. The top and longest leaf, 36, is frequently known as the "master leaf"; and is shown as provided in its end portions with the loops 44 and 45 to receive the front and rear shackle bolts in the usual manner. I have also shown this assembled spring as provided with the top plate and the bottom pad 46 and 47, respectively, and the through bolt 48 extending through the central portions of the leaves and through the plate 46 and pad 47, according to usual practice. This bolt serves to hold the central portions of the spring leaves firmly together at all times. The pad 47 is supported by or connected to the axle in the usual manner, as by means of clips (not shown).

Between the successive spring leaves 36—37, 37—38, 38—39, 39—40, 40—41, 41—42, and 42—43, I provide the interlayers 49, 50, 51, 52, 53, 54, and 55, respectively, said interlayers being composed of the high internal resistance material are preferably of substantially the full widths of the spring leaves between which they are located, and said interlayers are firmly adhered or connected to the proximate surfaces of the spring leaves, as by cementing the interlayers to such surfaces, or by forming the interlayers directly in place between the spring leaves according to the method already stated herein.

I have provided suitable spacers between the spring leaves which spacers are designed and placed and secured in place to transmit the direct forces between the ends of the spring leaves. Thus, in Figure 1 I have shown the ends of the spring leaves as upturned as at 56 an amount to just reach the bottom surfaces of the longer spring leaves directly above them; and I have also shown in said figure the short spacers 57 between the successive spring leaves, and formed of suitable material capable of receiving and carrying the forces of pressure transmitted between the spring leaves at this point, such as the force developed by tightening the through bolt 48. By use of these end spacers (upturned lugs 56) and central spacers 57 all forces of compression existing between the successive spring leaves are transmitted directly and not through the interlayers of resistance material.

It is also here noted that these spacers between the successive spring leaves serve to provide between said spring leaves the relatively thin or laminar spaces for accommodation of the bodies of high resistance material, but without subjecting said bodies to forces of compression in normal operation.

Figures 3, 4, 5, 6:
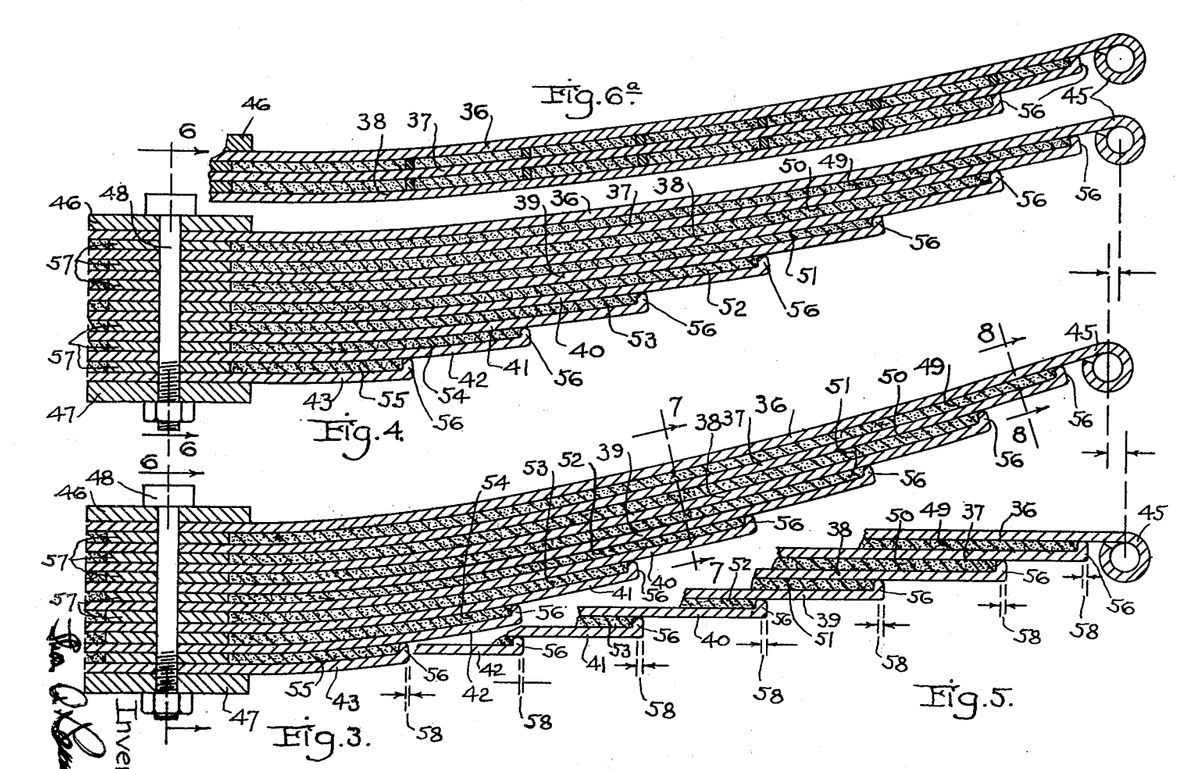
Figure 3 shows on enlarged scale as compared to Figure 1 the right hand one-half of the spring of Figure 1, also in relaxed condition, and it shows the interlayers completely occupying the spaces between successive spring leaves.
Figure 4 shows a section similar to that of Figure 3, but with the spring normally loaded, that is, with the leaves forced down into their normally loaded positions and relationships, so that some movement has occurred relatively between the end portions of successive spring leaves.
Figure 5 shows a fragmentary section similar to those of Figures 3 and 4, but with the spring fully loaded, that is, beyond the "normal" position of Figure 4; and it shows by the short lines adjacent to the ends of the various leaves the approximate shifts occurring between the positions of the ends of the successive leaves during shift from the condition of Figure 3 to the condition of Figure 5.
Figure 6ª shows a fragmentary section similar to that of Figure 4, but with the subdivision of the interlayers into numerous subsections, and with numerous spacers between the successive spring leaves.
Figure 6:
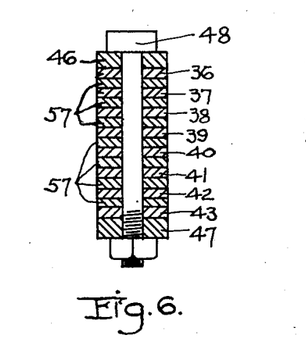
Figure 7:
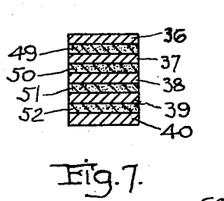
Figure 7 shows a cross-section taken on the line 7—7 of Figure 3, looking in the direction of the arrows.
Figure 8:
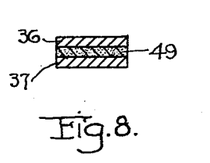
Figure 8 shows a cross-section taken on the line 8—8 of Figure 3, looking in the direction of the arrows.

In Figures 3, 4 and 5 I have shown on enlarged scale the right hand half of the spring shown in Figures 1 and 2; Figure 3 showing the spring in fully relaxed or non-loaded condition, Figure 4 showing the spring in normally loaded condition, and Figure 5 showing the spring in excessively loaded or straight condition.

Since the resistance or damping bodies are adhered firmly to the proximate spring leaf surfaces it follows that such flexure of the spring leaves results in deformation of the interlayer body. This deformation consists in a twisting of the material of the body; since if we consider any short or differential section of the interlayer, which section is adhered firmly to the spring leaf surfaces above and below it, a movement of said spring leaf surfaces relative to each other can only result in such a twisting of such differential portion of interlayer body. The amounts of these deformations for portions of the interlayer body located at different distances from the point of axle support will depend on these distances, and also upon the separation between the spring leaves, that is, the height of such portion of interlayer body. The foregoing is of course for a specified amount of change in spring loading. Accordingly, I have shown, in Figure 5, more or less approximately, the total amounts of sliding or deformation occurring between successive pairs of spring leaves by the short vertical lines 58, for the condition of flexure from the unloaded or normal free spring leaf forms of Figure 3 to the condition of excessively loaded forms shown in Figure 5, these amounts of sliding movement being the amounts at the free ends of the several spring leaves.

It may be here remarked that since it is intended that these interlayers shall be firmly adhered to the spring leaf surfaces above and below them, in those cases in which said interlayers are formed from sheets of material set between and cemented to the spring leaves it may be desirable to originally make such layers slightly oversize, that is, slightly greater than the clearances allowed between the spring leaf surfaces to ensure that firm engagement shall occur. Then the bringing together of the spring leaves by tightening of the through bolt 48 will slightly compress these interlayers; but due to their nature they can be readily thus compressed into final form. Then, due also to their nature, they will ultimately accommodate themselves to such slight deformation, and retain their forms, fully occupying the spaces between the spring leaves.

Figure 9:
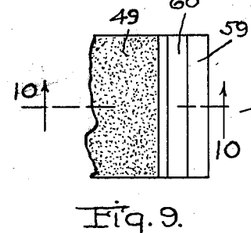
Figure 9 shows a fragmentary plan view taken on the line 9—9 of Figure 10, looking in the direction of the arrows; and it shows a modified form of spacer arrangement including a roller bearing support for the superimposed spring leaf.
Figure 10:
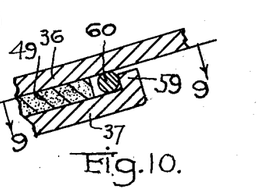
Figure 10 shows a longitudinal section taken on the line 10—10 of Figure 9, looking in the direction of the arrows.
Figure 11:
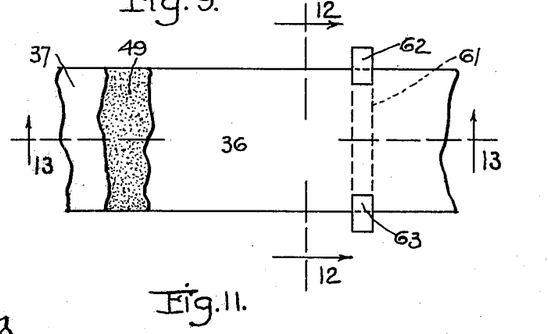
Figure 12:
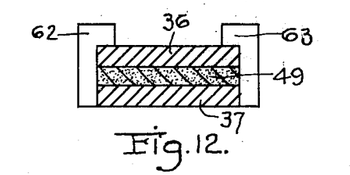
Figure 12 shows a cross-section taken on the line 12—12 of Figure 11, looking in the direction of the arrows.
Figure 13:
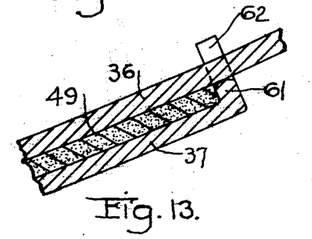
Figure 13 shows a fragmentary longitudinal section taken on the line 13—13 of Figure 11, looking in the direction of the arrows.
Figure 14:
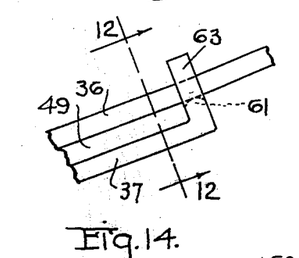
Figure 14 shows a fragmentary side view corresponding to Figures 11, 12 and 13.

In Figures 9 and 10 I have shown a modified form of the spacers between the free ends of the spring leaves. In this case the lug 59 provided on the end of the lower leaf is not high enough to contact the bottom face of the superimposed leaf, but a short roller 60 is set in place against such lug, or prevented from being displaced endwise by such lug, said roller being itself of the proper diameter to meet and sustain the load of the spring leaf above it. In such case, if desired, the interlayer material may be discontinued short of such roller to permit slight freedom of rolling action during flexures of the leaves with respect to each other.

In Figures 11, 12, 13 and 14 I have shown another modification, in which provision is made to prevent actual displacement of a leaf from the interlayer under conditions of excessive recoil and the like. In this case the shorter leaf is provided in its end portion with the supporting separator 61 which carries the normal load to be transmitted from one leaf to the other, of the same elevation as the thickness of the interlayer; and also is provided with the side hook portions 62 and 63 which reach over the superimposed spring leaf edges sufficiently to retain such superimposed leaf against direct bodily displacement away from the lower leaf and from the interlayer. This will assure against tearing away the cemented or adhered connection between the interlayer and the spring leaf surfaces.

Figures 15, 16, 17, 18:
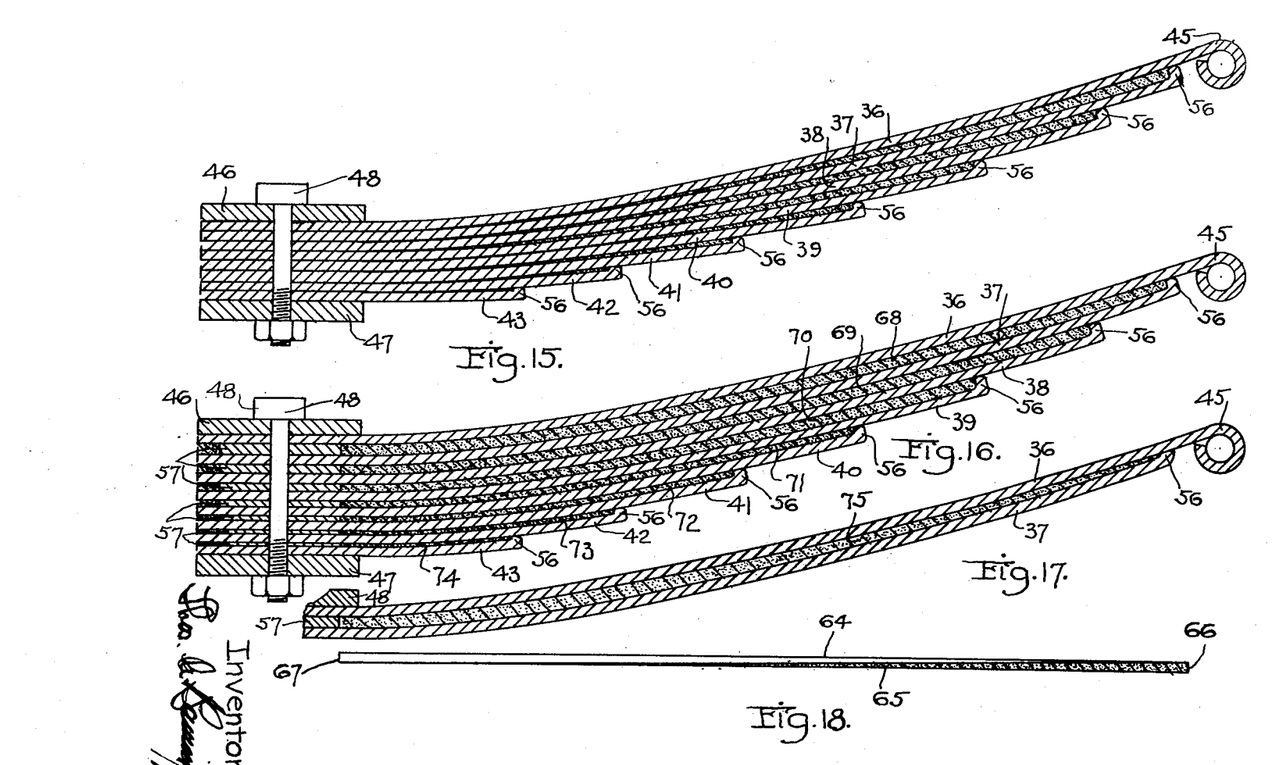
Figure 15 shows a view similar to that of Figure 3, but with a modified form of interlayers in which said interlayers are of progressively less thickness as the proximate spring leaves are also of decreasing length, and in which also each interlayer is of graduated thickness in itself, measured from a maximum at the free end of the spring leaf to zero at the point of axle connection.
Figure 16 shows a view similar to that of Figure 3, but with a modified form of interlayers in which said interlayers are of progressively less thickness as the proximate spring leaves are also of decreasing length, but in which each interlayer is of substantially constant thickness throughout its length; the arrangement of Figure 16 being in effect an intermediate condition between those of Figures 3 and 15.
Figure 17 shows a fragmentary section corresponding to Figure 3, but with a modified form of interlayers in which said interlayers are of thickness which decreases from the point of axle connection to the outer ends of the spring leaves, being a reversal of the general scheme shown in Figure 15, for special conditions.
Figure 18 shows schematically how the thickness of the interlayer should theoretically decrease as the point of axle connection is approached, being a maximum at the outer or free ends of the proximate spring leaves.

In Figure 18 I have shown by the distance between the lines 64 and 65 the proportionate amount of sliding action which occurs between different portions of the proximate spring leaf surfaces at different amounts of separation from the point of axle connection. Thus, at the end 66 said separation between these lines 64 and 65 is a maximum, and tapers to zero at the end 67, and the shaded or stippled surfaces between these lines 64 and 65 may be said to represent the manner in which an interlayer between the lines or surfaces 64 and 65 should vary in order to secure the same and uniform amount of deformation of all portions of an interlayer.

In Figure 16 I have shown a modified embodiment of the features of my present invention. In this case I have shown the successive interlayers 68, 69, 70, 71, 72, 73 and 74, as being of successively less thickness, measured from top to bottom of the stack of spring leaves; and these successive interlayers are of thicknesses substantially proper according to the lengths of the successive spring leaves and according to the schematic showing of Figure 18. These interlayers of Figure 16 are each of uniform thickness throughout its length, and there are provided the separators between the several spring leaves of sizes also correct according to the thicknesses of the interlayers. The principal difference between the arrangement of Figure 16 and that of Figures 3, 4 and 5 is that the several interlayers and separators of Figure 16 are graduated according to lengths of the spring leaves; but still in the scheme of Figure 16 the material of each interlayer body will suffer different amounts of deformation at its various sections, measured from the point of axle connection.

In the arrangement of Figure 15 I have shown still another modified arrangement. In this case each interlayer as a whole also is of varying thickness, measured from one end of the spring leaf to the other. Each of these interlayer bodies is of a maximum thickness at the free end of the spring leaf, and such thickness is selected according to the length of the spring leaf, and according to the schematic showing of Figure 18. Each interlayer body then varies in thickness from such maximum value to zero at the point of axle connection. In other words, with this doubly adjusted interlayer form scheme of Figure 15, all portions of each interlayer body are subjected, for a given amount of change of loading on the spring, to equal amounts of change of deformation. Such being the case the desired total amount of damping or resistance action may be secured by use of a minimum amount of high resistance material in the spring as a whole. It is also noted that with this scheme of Figure 15, since the interlayer bodies all taper to zero at the position of axle connection, there are needed no separators at such point, the successive spring leaves coming directly together as shown in Figure 15.

In some cases it may be desired to provide an excessive amount of damping or resistance action in the free end portions of the spring leaves, as compared to other forms previously shown herein. In such case it is possible to use the scheme shown in Figure 17, wherein only a single pair of spring leaves is shown with a single interlayer body between them, but this is merely for purposes of illustration. This interlayer body 75 is shown as being of maximum thickness at its inner end or point of axle support, and as tapering in thickness to a less thickness at its outer or free end. A suitable separator is shown at each end of the lower spring leaf, according to the principles hereinbefore stated.

In Figure 6ª I have shown still another modified embodiment of my present invention. In this case each interlayer is shown as being subdivided into a series of subsections, each of which is firmly adhered to the proximate surfaces of the spring leaves; and in this scheme I have also shown the supplemental separators 76 extending between the proximate surfaces of the two spring leaves and located between these subsections of the interlayer body.

In case of interlayers composed of a suitable high resistance "rubber" or the like these interlayers may be formed in place between the spring leaves by suitable vulcanizing operations. Such high resistance "rubber" or like material may be possessed of a certain amount of resiliency and the resistance constant of such material may be controlled by the composition of the material used, and its vulcanizing treatment.

In some cases the separators between the spring leaves, especially those between the free ends of such leaves, may be dispensed with, when the resistance material used for the interlayers possesses sufficient permanence of form to resist permanent deformation under the loads to which it will be subjected as such interlayers.

It is also to be noted that when using high resistance "rubber" or high resistance rubber-like materials for the interlayers, which interlayers are cemented or otherwise adhered to the spring leaf surfaces, said interlayers will in some cases not accommodate themselves after a time interval to distortions to which they are subjected. When using such materials as interlayers it is possible to either form them in place between the spring leaves while said leaves are in normally flexed condition, by normal loading, so that such normal flexed form of the spring leaves and the interlayers, will be the form in which the interlayers are in relaxed condition, that is, not under internal stress. Under such conditions said interlayers will act to produce a modification of the spring constant $K_2$ of these leaf springs, since the spring action of such interlayers will act to oppose the further relaxing of the springs under released loading.

I contemplate using a resistance body in combination with the spring leaves which will reduce the peak portion of the curve according to the principle shown in Figure 20 to a value such that even at resonance there is no harmful increase in amplitude; or in some cases, a resistance body in combination with the spring leaves which will completely avoid the rise in the value of the curve even at resonant frequencies. In any case, however, the resistance body will be chosen according to the amount of increase in amplitude at resonant frequency which the designer deems permissible, and taking into proper account the spring constant and other factors of the desired spring.

I claim:

1. An automobile leaf spring comprising a series of spring leaves of progressively shorter lengths stacked in vertical alignment, the free ends of each succeeding lower leaf terminating short of the free ends of the next higher leaf, means to secure the central portions of the leaves in rigid connection with respect to each other, connections for attachment of a load to the free ends of the upper and longest leaf for imposition of a load tending to depress said free ends against the free ends of the adjacent lower leaf, spacers between the free end portions of the leaves establishing interlayer spaces between the leaves and for transmission of loading forces from leaf to leaf at the free ends of the successively lower leaves, together with bodies of high resistance non-resilient plastic material located in said interlayer spaces and extending between the proximate surfaces of the adjoining spring leaves, and strongly adhered to said proximate surfaces, whereby deflections of the leaves of said spring due to changes of loading produce distortions of contour of said bodies of high resistance non-resilient plastic material with production of accompanying internal stresses in said bodies, and with production of damping effects in said spring.

2. A spring as defined in claim 1, wherein said bodies of high resistance non-resilient plastic material completely occupy said interlayer spaces.

3. A spring as defined in claim 1, wherein said interlayer spaces are of substantially uniform thickness throughout their respective lengths.

4. A spring as defined in claim 1, wherein said interlayer spaces are of substantially uniform thickness throughout their respective lengths and wherein all said spaces are of substantially the same thickness.

5. A spring as defined in claim 1, wherein said interlayer spaces are of substantially uniform thickness throughout their respective lengths and are of progressively lesser thicknesses in the direction of shortening spring leaves.

6. A spring as defined in claim 1, wherein said interlayer spaces are of progressively lesser thicknesses in the direction of shortening spring leaves.

7. A spring as defined in claim 1, together with means to retain the free end portions of the leaves against separation directly from each other.

8. A compound spring comprising a plurality of spring leaves and bodies of high resistance non-resilient plastic material located between said leaves and firmly adhered to the proximate surfaces of said leaves, whereby changes of deflection of said leaves with changes of loading produce distortions of said bodies with production of resistance effects to said changes of deflection.

9. An automobile having a leaf supporting-spring comprising a series of spring leaves stacked in vertical alignment, means securing vertically aligned portions of the leaves in rigid connection with respect to each other, a road supported element connected to said vertically aligning connected leaf portions, a connection for attachment of the automobile load to a free end of the upper leaf for imposition of a load tending to depress said free end against the free end of the adjacent lower leaf, spacers between the free end portions of the leaves establishing interlayer spaces between the leaves and for transmission of loading forces from leaf to leaf at the free ends of the successively lower leaves, together with bodies of high resistance material located in said interlayer spaces and extending between the proximate surfaces of the adjoining spring leaves, and strongly adhered to said proximate surfaces, whereby deflections of the leaves of the spring due to changes of loading produce distortions of contour of said bodies of high resistance material with production of accompanying internal stresses in said bodies, said high resistance material having a value of "R" sufficiently great in the equation $$A = \frac{K_1 a}{\sqrt{W^2 R^2 + (W^2 M - (K_1 + K_2))^2}}$$

so that the amplitude of vibrations of the automobile for the resonant frequency of road irregularities is substantially not greater than the amplitude of vibrations of the automobile for non-resonant frequencies of such irregularities in which equation "A" designates the amplitude of axle vibrations, "$K_1$" designates the spring constant of the tires, "$a$" designates the amplitude of road vibrations, "W" designates the frequency of encountering road vibrations, "R" designates the resistance constant of the resistance material located in the interlayer spaces between the proximate surfaces of the adjoining spring leaves, "$K_2$" designates the spring constant of the leaf springs, and "M" designates the mass of the axle and wheels connected thereto.

THOS. A. BANNING, JR.

REFERENCES CITED

The following references are of record in the file of this patent:

UNITED STATES PATENTS

| Number | Name | Date |
|---|---|---|
| 1,207,992 | Owen | Dec. 12, 1916 |
| 1,280,415 | Currey | Oct. 1, 1918 |
| 1,443,545 | Lord | Jan. 30, 1923 |
| 1,532,565 | Winestock | Apr. 7, 1925 |
| 1,546,896 | Herbert | July 21, 1925 |
| 1,595,411 | Lord | Aug. 10, 1926 |
| 1,612,150 | Plank | Dec. 28, 1926 |
| 1,759,722 | Watson | May 20, 1930 |
| 1,967,088 | Geyer | July 17, 1934 |
| 2,052,930 | Laursen | Sept. 1, 1936 |

FOREIGN PATENTS

| Number | Country | Date |
|---|---|---|
| 13,293 | Great Britain | 1884 |